July 29, 1941. R. B. ARNOLD 2,250,943

METHOD OF FUMIGATING

Original Filed Jan. 21, 1937 3 Sheets-Sheet 1

INVENTOR
Robert B. Arnold
By Sawyer, Kennedy & Hermann & Hazell
ATTORNEYS

METHOD OF FUMIGATING

Original Filed Jan. 21, 1937 3 Sheets-Sheet 2

INVENTOR
Robert B. Arnold

BY Spencer Kennedy Thomason & Hazell

ATTORNEYS

METHOD OF FUMIGATING

Original Filed Jan. 21, 1937 3 Sheets-Sheet 3

INVENTOR
Robert B. Arnold
BY Sawyer Kennedy Dimmessen & Hazeld
ATTORNEYS

Patented July 29, 1941 2,250,943

UNITED STATES PATENT OFFICE 2,250,943

METHOD OF FUMIGATING

Robert B. Arnold, Stonewall Courts, Va., assignor to Tobacco By-Products and Chemical Corporation, Louisville, Ky., a corporation of Delaware Original application January 21, 1937, Serial No. 121,447. Divided and this application July 22, 1939, Serial No. 285,882

7 Claims. (Cl. 21—58)

This invention relates to a method of fumigating plants with fumes containing nicotine, or similar insecticidal material having a boiling point approximately the same as that of nicotine.

This application is a division of my application Serial No. 121,447, filed Jan. 21, 1937, for Apparatus for fumigating.

The advantage of applying an insecticide in vapor or gaseous form to plants has long been recognized, as, for example, in killing scale insects on citrus fruit trees with hydrocyanic gas, using a tent over the tree during the fumigation, and in the fumigation of plants in greenhouses with nicotine vapors or other similar material to destroy aphis and other insects.

On account of the fact that fumes will reach all parts of the surfaces of plants with certainty, thereby overcoming the disadvantages inherent in dusting or spraying methods which frequently do not reach all such surfaces, and hence leave parts of the plant unprotected, the desirability of a fumigating method for the destruction of insects on plants in the open by the use of nicotine has been considered a desideratum and many attempts have been made to apply nicotine to plants in the open by fumigating methods, but without commercial success. In all such attempts, of course, it is customary to provide a temporary enclosure for the plant, such, for example, as a traveling apron or canopy, in order to restrict the escape of the fumes into the surrounding air and hold said fumes in contact with the plant for, at least, a short time. So far as nicotine fumes are concerned, these prior attempts, even where a canopy or apron has been used, have not satisfactorily accomplished the purpose intended.

As the result of a number of experiments particularly aimed at the destruction of insects, such as the pea aphis, in the field, applicant has found that, by the prior methods and apparatus for producing insecticidal fumes, it was impossible to produce a sufficient concentration of nicotine in the fumes when working in the open with the usual enclosing means, such as a canopy, tent, apron, or like temporary enclosure intended to hold the fumes in contact with the plant, not only because there is a relatively rapid escape of fumes from and admission of air to the interior of the enclosing means, but also, and what is more important, because there is an inherent impossibility of obtaining, by prior methods, a sufficiently high concentration of nicotine to kill the insects quickly. Even when applying nicotine to plants in tightly closed spaces, such as greenhouses, the results have not been satisfactory, except where the fumes were retained in contact with the plants for a relatively long time. While the method of the present invention is particularly important for the application of nicotine to field and garden crops where a traveling canopy is used and, hence, the fumes are retained for only a relatively short time in contact with the plant, and some escape of fumes and some admission of air cannot be avoided, it is also advantageous when employed for the treatment of plants in closed spaces, such as greenhouses, conservatories, hot beds and the like, on account of the rapidity and certainty of action.

The object of the present invention is to provide a method for producing, and applying to plants, a nicotine fume which will immerse those insects sensitive to nicotine in fumes having such a relatively high concentration of nicotine that the destruction of such insects, or a very high percentage thereof, is assured in the limited time they are within the temporary enclosure.

With this general object in view, the method includes the use of anhydrous, or substantially anhydrous, nicotine as a starting material, the production from it of what may be termed chiefly nicotine gas, to distinguish it from mere vapor, by heating the nicotine above its boiling point, the combination of such nicotine gas, before, after and during gasification, with a suitable diluent, most advantageous a hydrocarbon, which also is vaporized, the nicotine gas and the vapor of the diluent being discharged as a mixture which is then further diluted by the atmosphere and comes into contact with the plants to be fumigated, the proportion of nicotine gas in the mixture as it is discharged being relatively very high, so that when the mixed fumes are further diluted by the atmospheric air and other fumes within the temporary enclosure, the final concentration of nicotine in the resultant mixture is high enough to insure the requisite high percentage of kill of the insects attacked and thereby make the fumigation a success.

One form of apparatus particularly suitable and economical for carrying out the method is illustrated in the accompanying drawings, in which.

Figures 1, 2:
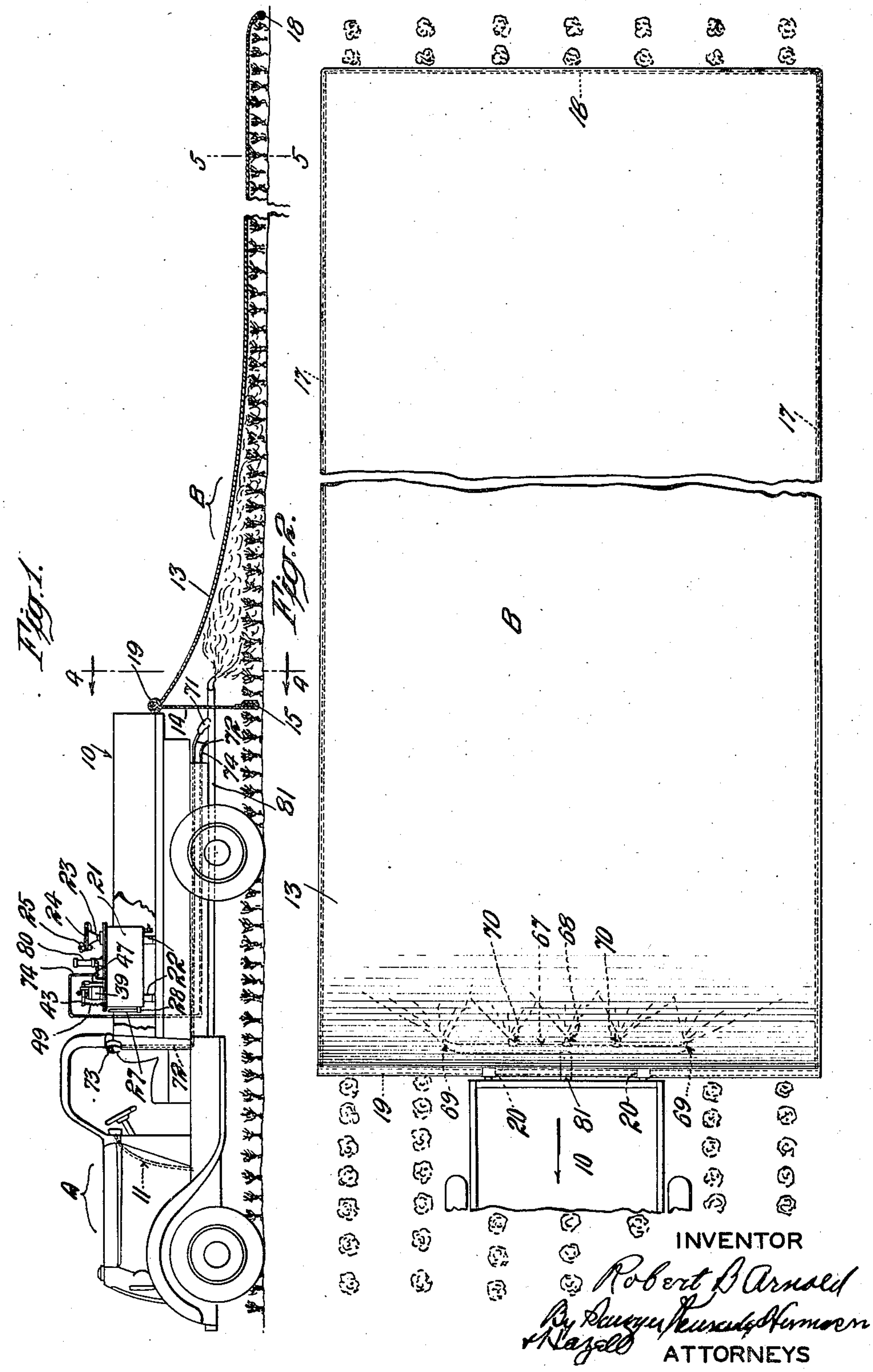
Fig. 1 is a side elevation, partly in section, of an automobile fumigating apparatus embodying the invention.
Fig. 2 is a plan view, rear partly broken away, of the rear portion of the apparatus shown in Fig. 1.
Figures 3, 4, 5:
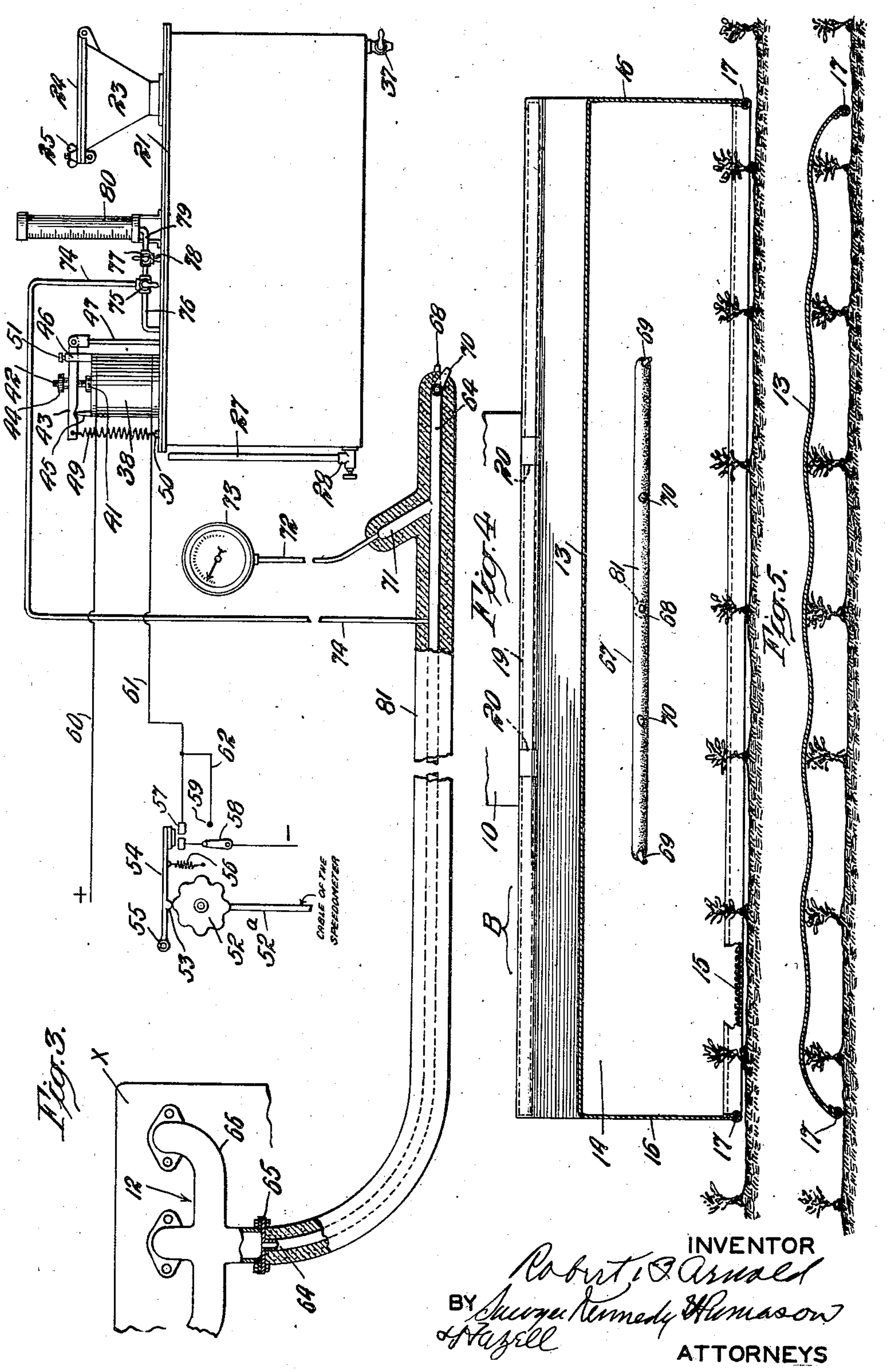
Fig. 3 is a detail view, somewhat diagrammatic, and partly in section, of the essential parts of the apparatus for producing and distributing the fumigating gas and vapors.
Fig. 4 is a vertical section on the line 4—4, Fig. 1.
Fig. 5 is a similar view on the line 5—5, Fig. 1.

Referring to the drawings, and more particularly to Figs. 1 and 2, A indicates an automobile, here shown as a truck of any usual construction, the engine or motor X, Fig. 3 as shown, being, as usual, an internal combustion engine, with a manifold for the exhaust ports and having a speedometer driving mechanism for a speedometer shaft, or cable.

The body of the truck is indicated at 10, and the speedometer shaft in dotted lines, at 11. The exhaust manifold is illustrated in Fig. 3 at 12.

At the rear end of the truck body is attached a temporary enclosure B, for field plants, for example, peas, this enclosure being in the form of an apron or canopy of airtight flexible material, such as woven fabric impregnated or coated with a suitable elastic composition, usually a rubber compound. The apron or canopy has a top 13, a flexible front wall 14 having a pocket at its lower end containing a rope, or chain 15, to serve as a weight which will tend to keep the bottom of the front wall close to the ground, and two side walls 16, Fig. 4, also provided at the lower edge with pockets containing means for weighting the lower edges, usually rope or chain 17. The extreme rear end of the apron also is provided with a pocket containing rope or chain 18. At the line where the top 13 meets the top of the front wall 14, there is formed a pocket through which passes a bar or rod 19, passing through and held fixedly by loops or eyes 20, Fig. 4, which are connected in any suitable way at the rear end of the body of the truck. The length of the apron is such that at a predetermined rate of travel of the truck, said apron will enclose a plant for about two-thirds of a minute. The width of the apron may be selected with more freedom than the length of it, being somewhat related to the size and power of the truck. An apron 100 feet long and about 20 to 30 feet wide is generally used for a truck of the type termed a one and a half ton truck, to travel about one and a half miles per hour while doing the fumigating. This will enable about three to five acres per hour to be fumigated, which is entirely satisfactory in practice but impossible of attainment with the weak nicotine fumes heretofore tried.

Suitable means for discharging fumes having a relatively very high nicotine content is provided. This comprises a tank for carrying a supply of nicotine of the proper kind, or a liquid composition, essentially nicotine, means for supplying the nicotine at a predetermined rate, and means for rapidly heating the nicotine above the boiling point to form a fume which is largely gaseous nicotine and for discharging the nicotine within the temporary enclosure. The best construction includes means for measuring the rate of discharge of the nicotine without loss thereof and means for adjusting the rate of discharge.

Figures 6, 7, 8, 9:
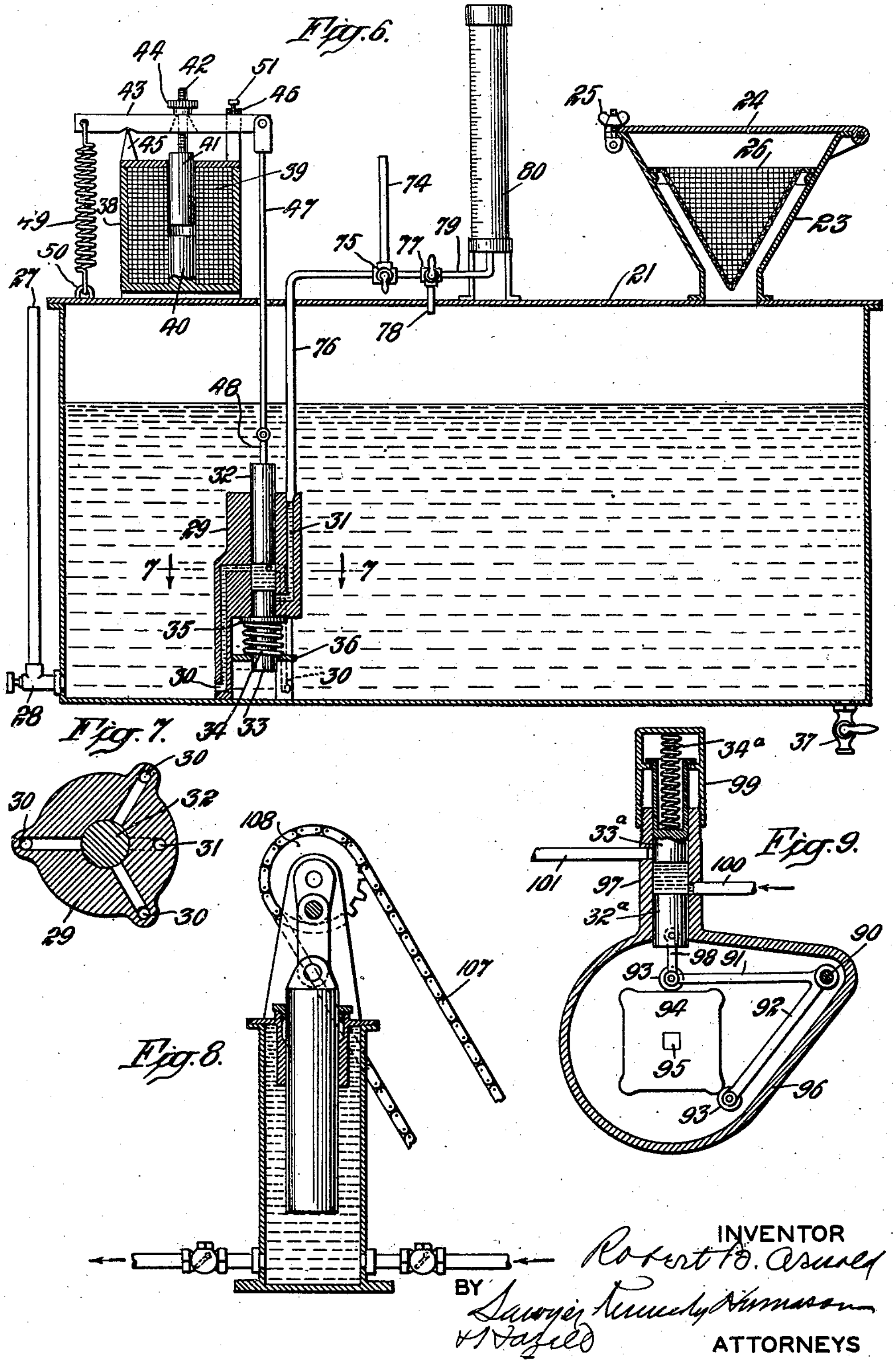
Fig. 6 is a vertical sectional view, partly in elevation, and on an enlarged scale, of the tank and the devices carried by it.
Fig. 7 is a horizontal section on the line 7—7, Fig. 6.
Fig. 8 is a vertical sectional view, partly in elevation, of a modification of the pumping apparatus.
Fig. 9 is a similar view of another modification of such pumping apparatus.

The tank 21, Figs. 1, 3 and 6, is carried by the truck body, being mounted on suitable supports 22. In the best form of apparatus the tank is provided at the top with a filling opening and a filling funnel 23, which has a lid 24 hinged to the funnel and arranged to be locked by a swinging bolt having a thumb-nut as indicated at 25, Fig. 6. Within the funnel is detachably mounted a conical strainer 26, having a flanged margin which rests on a bead formed on the inside of the funnel. The tank also has its front end provided with a vertical tube 27 of glass, whose upper end is open and whose lower end communicates with the interior of the tank through a suitable valve 28. Within the tank and secured to its bottom is a pump arranged to discharge the nicotine fumigating material. In the form of apparatus shown in detail in Fig. 6, the pump comprises a cylinder 29, provided with a plurality of inlet ports 30, three being shown, and with one discharge port 31. The pump has two pistons, one, 32, of which is positively and regularly reciprocated by a suitable driving means, as more fully explained hereinafter, while the other piston 33 is spring-pressed, in an upward direction, by means of a spring 34 bearing against a collar 35 on the piston and against an abutment and guide plate 36. When the piston 32 is at the upper end of the stroke, the inlet ports 30 are open to the cylinder, and liquid enters the space beneath the piston 32. At this time the lower piston 33 is in its extreme uppermost position and closes the discharge port 31. When the piston 32 descends, it gradually closes the inlet ports 30 and traps a constant quantity of liquid in the cylinder. On its further downward movement it creates a pressure, which acts on the upper face of the lower piston 33 and drives it downward, against the action of the spring 34. The downward movement of the lower piston 33 uncovers the discharge port 31, and thereafter the further descent of the upper piston 32 causes the liquid to be forced up the discharge port. The amount of liquid discharged from the cylinder per stroke depends upon the length of travel of the upper piston 32. For less than full capacity of the pump some liquid travels up and down in the cylinder. At the start of the upward stroke of the upper piston 32, the lower piston, forced by spring 34, closes the discharge opening and reaches the end of its upward stroke, which is determined by the fixed position of the collar 35. The upper piston 32 continues its upward stroke, creating a vacuum in the cylinder until it uncovers the inlet ports, whereupon liquid is drawn into the cylinder through the inlet ports. Of course, with the pump in the bottom of the tank, as shown in Fig. 6, there is also a gravity feed of liquid to the pump as long as the level of the liquid in the tank is above the upper ends of the inlet ports. As it is customary to fill up the tank before it is entirely emptied, the pump usually operates with a gravity supply to the inlets. At the same time at the last of the operations, when it is desired to empty the tank completely, the pump will suck up, that is, lift the remaining fluid, due to the vacuum formed. By keeping the exterior openings of the inlet ports as close to the bottom of the tank as is possible, the tank may be practically emptied, and any remaining liquid may be drawn off through a drain cock 37.

The upper pump piston may be reciprocated in any suitable way, but in the best construction an electric solenoid and plunger device is advantageously employed. This comprises an iron-clad solenoid, whose iron jacket is indicated at 38, Fig. 6, its solenoid winding at 39, its fixed core at 40, and its reciprocating plunger at 41. The plunger has a screw-threaded stem 42, passing through a hole in the lever 43 and provided with a thumb-nut 44, above the lever and resting thereon, the contacting face of the nut being rounded and the lever correspondingly cupped to receive the rounded part. The hole in the lever 43 is formed to give a clearance about the stem, whereby the angular movement of the lever is permitted while the stem moves in a vertical line, only.

The lever 43 is fulcrumed in any suitable way. As illustrated, it has a knife-edge fulcrum post 45, fixed to the top of the iron jacket 38 of the solenoid. The lever 43 is guided, close to one end, by a stirrup-shaped guide 46, also fixed to the top of the iron jacket 38, this end of the lever 43 being connected to the upper piston 32 by a pitman 47, pivotally connected to the lever 43 and to a stem 48 carried by the said piston 32.

The lever is pulled down by the plunger 41 when the coil 39 is energized, and is raised by a tension spring 49 connected to the lever at its end remote from the pitman connection, and also connected to an eye 50, fixed to the top of the tank.

The limit of the stroke of the upper piston 32, in an upward direction, may be adjusted by means of an adjusting screw 51 carried by the stirrup-guide 46, which once set so that piston 32 clears inlet ports 30, remains fixed. By adjusting the thumb-nut 44, the range of the downward movement of the plunger 41 may be determined and, therefore, that of the upper piston 32.

The solenoid coil 39 is included in an electric circuit arranged to be energized by a suitable source of electricity and to have pulsations of current through it. In the present construction, the circuit is energized from the usual storage battery provided for the ignition and starting apparatus of the truck, this battery not being shown. Within the circuit is included a circuit interrupter of any suitable kind. In the present construction the circuit interrupter comprises a rotary cam 52, Fig. 3, which is driven by the flexible shaft 52*a*, usually employed to drive the speedometer, whose meter is removed. The cam has a plurality of cam projections arranged to contact with a stud or nose 53, carried by a contact lever 54, pivoted at 55 and urged toward the cam by a spring 56. The contact lever is arranged to open and close the circuit through a pair of contact devices 57, which are included in the electric circuit. In addition a switch 58 is provided which will open the circuit between the source of electricity and the contact device 57. This switch may be swung to engage a contact device 59, included in a shunt which by-passes the contact devices 57. The usual circuit wires are indicated at 60 and 61, the shunt wire being indicated at 62.

When the truck is traveling in the field the flexible shaft 52*a* is revolved, as usual, and thereby the cam 52 is rotated in proportion to the distance traveled by the truck, whereby the electric circuit to the solenoid is energized by a pulsatory current, the number of pulsations in a unit of time being directly proportional to the distance traveled by the truck in the same time, and consequently the pump piston 32 is reciprocated by the solenoid plunger at a rate also proportional to the rate of travel of the truck. As each discharge stroke of the pump discharges a uniform predetermined quantity of liquid, it follows that the liquid discharge from the pump is directly proportional to the distance traveled by the truck.

The manual switch 58 not only permits the circuit to be opened when desired, but, also, provides a means for a manually controlled operation of the pump at any rate desired, merely by moving the switch 58 into and out of contact with the contact device 59. This makes it possible to utilize the apparatus for fumigating trees with the truck standing still and its motor running.

For the purpose of converting into fumes the liquid delivered by the pumping mechanism, a suitable heating means is provided. In order to accomplish the purposes of this invention, it is important that this heating means be so arranged that it will heat a sufficient quantity of the liquid to a temperature above the boiling point of nicotine (478° F.) in order to develop a fume which is chiefly nicotine in a gaseous condition, as distinguished from mere vapor, and, more particularly to do this at a relatively low cost.

While it is possible to utilize the exhaust from an internal combustion engine for heating purposes, applicant has found that under normal conditions of operation and with the usual exhaust pipes provided for automobile vehicles, it is not possible to gasify a sufficient quantity of nicotine to provide a concentrated atmosphere beneath the temporary enclosure of the required cubic contents. Therefore, in order to accomplish the required results, a special exhaust pipe is provided for the internal combustion engine of the truck. This exhaust pipe constitutes a retort and ejector. It differs from the ordinary exhaust pipe in having a much smaller diameter, which, of course, tends to create a somewhat higher pressure, and also reduces the radiating surface. It also is heavily insulated in order to maintain the temperature within the pipe. In the construction shown in Fig. 3, the exhaust pipe 64 is provided with a wide flange 65 at the end which is connected to the usual manifold 66 of the internal combustion engine by suitable bolts. In practice it has been found that an exhaust pipe of one inch internal diameter is entirely satisfactory and even a half inch pipe may be used without injuriously affecting the operation of the engine by too great a back pressure, where the ordinary exhaust pipe would have an internal diameter of about 1½ to 2 inches.

At the discharge end of the exhaust pipe there is provided a header 67, which carries a series of nozzles, which, in the best construction, project in different directions, so as to distribute the discharged fumes and quickly form a mixture of the fumes with the atmosphere within the apron or other temporary enclosure. In the structure illustrated there is provided a nozzle 68 at the center of the header, arranged to discharge fumes along a substantially central line and slightly downward. At each end of the header there is a nozzle indicated at 69 which discharges in an outward and downward direction. Between the central nozzle 68 and each end nozzle 69 there is an intermediate nozzle 70, which discharges in an outward and downward direction, but at a lesser angle than that of the end nozzles.

Suitable means is provided for ascertaining the temperature near the end of the exhaust pipe. In the present construction the exhaust pipe is provided with a dead end branch pipe 71, in which a suitable thermometric device may be fixed, this being connected through a tubing 72, with a suitable indicator 73. The details of the thermometric device are not shown, as such devices are well known and in commercial use. It is, of course, to be kept in mind that the thermometric device shall be one which is reasonably accurate at temperatures up to or around 575° F. at least.

The exhaust pipe is supplied with the fumigating liquid through a suitable tube or pipe 74, Figs. 3 and 6, controlled by a three-way cock 75 at the end of a pipe 76, which is connected to the discharge port 31 of the pump. The cock 75 is connected to another three-way cock 77, which is connected to two pipes 78 and 79, the former discharging into the tank, and the latter, 79, discharging into the bottom of a transparent graduated measuring cylinder 80 supported on the tank, this cylinder having its upper end open to the air. By suitable arrangement of the cocks 75 and 77, the pump discharge may be sent out over the tubes or pipes 76 and 74 to the exhaust pipe 64, or for purpose of testing may be sent into the cylinder 80, where the rate of discharge of the pump may be measured by observing the quantity pumped in a given distance traveled. This permits adjustment of the length of stroke of the pump piston 32 to be made so as to obtain the desired rate of discharge of the liquid to the exhaust pipe. When this has been done, the cock 75 may be turned to send the liquid to the exhaust pipe, and the cock 77 may be turned to allow the liquid in the measuring cylinder 80 to flow back to the tank. If desired the cocks 75 and 77 may be set so as to allow the pump to run and discharge back to its tank.

As hereinbefore stated, in order to obtain as high a temperature as possible in the exhaust pipe 64, the latter, as well as the branch 71, is provided with a very heavy thermal insulating jacket, indicated at 81. This is an important feature, since the source of heating, viz: the exhaust gases from the engine, are not normally hot enough by the time they reach the end of an exhaust pipe, such as normally employed, to maintain the temperature required by applicant for gasification of the nicotine. With the small exhaust pipe and the heavy insulating jacket employed in applicant's invention, it is possible to obtain the required temperature by retarding the spark of the ignition device, to a limited extent, and this is possible without seriously affecting the operation of the internal combustion motor, while driving the truck relatively slowly across a field.

With an apparatus such as hereinbefore described, the operator, after preliminary test and proper adjustment of the pump discharge, may drive across a field containing the plants to be fumigated, and apply a fumigating atmosphere of a high nicotine concentration to the crop.

A modified form of pumping apparatus to be used outside the tank is illustrated somewhat diagrammatically in Fig. 9. This pump is intended to be located just below the floor of the cab of the truck and is driven by the rigid speedometer shaft, as distinguished from the flexible shaft, or cable. In this construction, the spring-pressed piston is uppermost, and the power-driven piston is below it. The latter is reciprocated by a bell crank device pivoted at 90 and having two arms 91 and 92, each provided with a roller 93, these rollers being arranged to make contact with a cam 94, mounted on a shaft 95 driven from the internal combustion engine of the truck, in the manner stated above.

The cam and bell-crank device are enclosed in a housing 96, which supports the pump cylinder 97. The piston 32a is connected to the upper arm 91 of the bell-crank device by a pitman 98. The upper piston 33a is hollow at its upper end to receive the spring 34a, which bears at one end against the piston 33a and at the other end against a tubular adjusting nut 99, threaded into the outside of the pump-cylinder 97. By turning the nut, the tension of the spring may be adjusted. The inlet port of the pump is connected to a tank by means of a pipe, part of which is indicated at 100.

The discharge port is connected by a pipe 101 to the exhaust pipe in substantially the same way as was the pipe 76 of the construction shown in Fig. 6. It will be noted that in this modification the tubular nut 99 has a ledge or internal rib which serves to limit the downward movement of the piston 33a and thereby determines the amount of liquid drawn in by the pump at each stroke. Hence, by adjusting the nut not only is the spring pressure adjusted but also the quantity of liquid discharged is determined. The operation of the fumigating apparatus with this type of pump is substantially the same as with the apparatus shown in Fig. 6, which has been explained fully hereinbefore.

In Fig. 8 is illustrated another type of pump which may be used in some cases. This type of pump is a common plunger pump arranged to be driven by a sprocket chain 107, which passes around the sprocket wheel 108 fixed to the crank shaft of the pump and also around a sprocket wheel (not shown) suitably driven by the truck engine. With this type of pump, it may be mounted on a bracket on the body on the truck and driven from a sprocket wheel which, if desired, may be fastened to one of the vehicle wheels (not shown).

In order to utilize the apparatus most efficiently and obtain successful results with certainty, applicant has devised a fumigating composition consisting of substantially anhydrous nicotine with some water-free liquid petroleum hydrocarbon, the nicotine being in the larger proportion. In practice the nicotine is present to the extent of about 75 to 80% of the fumigating composition and the liquid petroleum hydrocarbon about 15 to 20%. There is usually present about 1 to 5 percent of non-aqueous impurities in the nicotine, these consisting of gums, or resins. Such a fumigating composition is non-corrosive and also acts as a lubricant for the pump. When it is discharged in a small amount into a heated retort, such as the exhaust pipe, hereinbefore shown and described, it is so rapidly heated that the liquid hydrocarbon, which contains at least one fraction whose boiling point is below that of nicotine (478° F.) immediately evolves a hydrocarbon vapor serving to form a protective atmosphere for the nicotine which, on account of the high temperature of the exhaust gases in the exhaust pipe, is quickly converted into the form of gas, as distinguished from mere vapor, and because of the hydrocarbon vapor, is protected against oxidation by any oxygen or moisture which may be present in the exhaust gases coming from the manifold of the internal combustion engine. The mixture of nicotine and liquid petroleum is not admitted to the exhaust pipe until after the truck engine has been running for a sufficient time, with the spark retarded, if necessary, to produce a temperature of at least 500° F. at the outer or discharge end of the exhaust pipe, as shown by the indicator of the thermometric device which, it is to be noted, is located close to the discharge end. This assures an efficient use of the nicotine so that the fumes ejected from the nozzles are at a high temperature and rich in nicotine gas. The fumes are well distributed within the atmosphere enclosed by the temporary enclosure and this distribution takes place while the nicotine is still in gaseous form so that a fine particle fume is produced. Therefore, even though the subsequent cooling is relatively rapid, the nicotine is so thoroughly distributed that it does not tend to coalesce into drops of liquid which will fall out from the atmosphere. The rate of supply of nicotine to the temporary enclosure is such that the concentration of nicotine in the atmosphere within such enclosure is from five to ten times that usually employed in greenhouses when fumigating plants therein, namely, about 2.5 to 5 lbs. of nicotine per 100,000 cubic feet of space. This rate of supply is determined roughly by the dimensions of the apparatus, but can be regulated to a considerable extent by adjustment of the stroke of the pump.

The fumes produced as above described are entirely satisfactory so far as insecticidal value is concerned. However, these fumes may be only faintly visible and not continuously so. As it is an advantage to have fumes which are permanently and plainly visible, thus enabling the operator to control better the fumigating operations, the fumigating composition in its best embodiment contains a small amount of smoke-producing material which will not injure the nicotine. For this purpose a liquid petroleum hydrocarbon having a boiling point between 700° and 800° F. is highly satisfactory. In usual practice the anhydrous nicotine is combined with a liquid petroleum composition which is free from water and which has fractions such that the distillation range of the mixture extends from about 400° F. to about 800° F., the proportion of those fractions whose boiling points lie between 700° and 800° F. being small compared with the lower boiling fractions.

Some suitable fumigating compositions are as follows:

*Example I*

| | Pounds |
|---|---|
| Anhydrous nicotine containing 98% nicotine | 82 |
| Mineral seal oil, 500° F.–700° F. | 16 |
| Light lubricating oil, 700° F. and above | 2 |

*Example II*

Another very satisfactory formula is as follows:

| | Pounds |
|---|---|
| Anhydrous nicotine containing 98% nicotine | 82 |
| Kerosene, 350° F.–500° F. | 13 |
| Light lubricating oil, 700° F. and above | 5 |

*Example III*

Formulas giving lower visibility are as follows:

| | Pounds |
|---|---|
| Anhydrous nicotine containing 98% nicotine | 82 |
| Mineral seal oil | 18 |

and

*Example IV*

| | Pounds |
|---|---|
| Anhydrous nicotine containing 98% nicotine | 82 |
| Mineral seal oil | 9 |
| Kerosene | 9 |

The term anhydrous nicotine as here used includes any nicotine which contains less than 1% of water. In practice, it is practicable to obtain nicotine having as low as 0.35 to 0.45% water.

Since the liquid petroleum hydrocarbons have a low latent heat of vaporization as compared with water, the heat supply furnished by the exhaust of an ordinary automobile truck when used in applicant's apparatus is sufficient to heat up the liquid composition well above the boiling point of nicotine and thereby largely gasify it.

It will be noted that in the apparatus shown, the exhaust pipe constitutes a gasifying retort which can be heated to a temperature above the boiling point of nicotine before the nicotine fumigating composition is admitted to it, and it is important that this temperature be maintained close to the discharge end of the exhaust pipe. Therefore, as the nicotine composition is delivered to the gasifying retort in liquid form and in a relatively small stream, it is rapidly and almost immediately heated to a temperature above the boiling point of nicotine, so that the hydrocarbon protective vapor or gas is formed almost immediately and in immediate contact with the nicotine, which is gasified so quickly thereafter, that there is practically no time or opportunity for any oxidation or other chemical action on the nicotine, by any reacting gases or vapors, so that the nicotine can be substantially all gasified and thereby diffused in gas form without the injury and decomposition which otherwise might result from such high temperatures.

Furthermore, it will be noted that there is a pressure somewhat above atmospheric in the gasifying retort, and the temperature is such as to be enough above the boiling point of nicotine at atmospheric pressure to cause it to gasify under said slight superpressure. Also, as a result of said pressure, the nicotine while still substantially all in gaseous form is swept out of the exhaust pipe through the nozzles and well distributed in the atmosphere beneath the temporary enclosures before it has had time to cool to vapor form, so that when it does cool it is so thoroughly disseminated that it cannot coalesce to large drops and fall out of the fumigating atmosphere.

In cases where the internal combustion engine cannot furnish sufficient heat to accomplish the desired results hereinbefore set forth, any suitable source of external heat may be provided, either an electric heating coil surrounding the retort portion of the exhaust pipe and energized from a suitable source, such as a generator on the truck, or a gasoline torch, or compressed gas-burner, whose flame plays on the outer wall of the exhaust pipe, the insulating jacket at one section over the retort portion being removed to allow access of the flame to the said wall. Or, a second internal combustion engine may be placed on the body of the truck and run idle at relatively high speed, the exhaust gases from which are piped to join the exhaust gases from the engine operating the truck, or which, alone may heat the retort for gasifying the nicotine solution.

No claim is made herein to the apparatus disclosed as that constitutes the subject-matter of the application Serial No. 121,447, filed Jan. 21, 1937, of which this is a division, nor to the composition per se which constitutes the subject matter of my application filed Dec. 28, 1936, Serial No. 117,881, patented June 14, 1938, No. 2,120,225.

What is claimed is:

1. The method of fumigating with a nicotine fumigating composition, which comprises heating, to a temperature above the boiling point of nicotine, a substantially water-free composition consisting principally of nicotine and containing a liquid hydrocarbon having a boiling point lower than that of nicotine, to form a fume whose nicotine content is mostly in gaseous form, diluting the said fume with exhaust gases while still maintaining the temperature of the mixture above the boiling point of nicotine, and utilizing the diluted mixture as a fumigant.

2. The method of fumigating with a nicotine fumigating composition, which comprises heating, to a temperature above the boiling point of nicotine, a substantially water-free composition consisting principally of nicotine and containing a mixture of liquid hydrocarbons, at least one of which has a boiling point below that of nicotine, and another of which has a boiling point higher than that of nicotine and less than 800° F., to form a smoky fume whose nicotine content is mostly in gaseous form, diluting the said fume with exhaust gases while still maintaining the temperature of the mixture above the boiling point of nicotine, and utilizing the diluted mixture as a fumigant.

3. The method of fumigating with a nicotine fumigating composition, which comprises heating, to a temperature above the boiling point of nicotine, a substantially water-free composition consisting principally of nicotine and containing a mixture of liquid hydrocarbons, at least one of which has a boiling point below that of nicotine, and another of which has a boiling point between 700° F. and 800° F., to form a smoky fume whose nicotine content is mostly in gaseous form, diluting the said fume with exhaust gases while still maintaining the temperature of the mixture above the boiling point of nicotine, and utilizing the diluted mixture as a fumigant.

4. The method of fumigating with a nicotine fumigating composition, which comprises heating a substantially water-free mixture of nicotine and a liquid petroleum hydrocarbon having fractions whose distillation range is from about 400° F. to about 800° F., to a temperature above the boiling point of nicotine, the nicotine forming the principal ingredient of the mixture, whereby a smoky fume is formed in which the nicotine content is mostly in gaseous form, diluting said fume with exhaust gases while still maintaining the temperature of the mixture above the boiling point of nicotine, and utilizing the diluted mixture as a fumigant.

5. The method of fumigating with a nicotine fumigating composition which comprises heating a substantially water-free mixture of nicotine with a liquid petroleum hydrocarbon whose boiling point is below the boiling point of nicotine, the nicotine forming the principal ingredient of the mixture, to a temperature above the boiling point of the nicotine, to form a fume whose nicotine content is mostly in gaseous form, diluting this fume, first, with exhaust gases from an internal combustion engine, while still maintaining the temperature of the mixture above the boiling point of nicotine, and then further diluting the mixture with air, and utilizing the resultant product as a fumigant.

6. The method of fumigating with nicotine fumigating composition which comprises heating to a temperature of about 500 to 550° F. a substantially water-free mixture of nicotine with a liquid petroleum hydrocarbon product whose fractions are all within the distillation range extending from 400° F. to 800° F., the lower boiling fractions forming the principal proportion of the hydrocarbon product, and the nicotine constituting at least seventy-five percent of the mixture, to form a fume whose nicotine content is substantially all in gaseous form, diluting said fume with exhaust gases while still maintaining the temperature above the boiling point of nicotine, ejecting the said dilute mixture into the atmosphere in a disseminated condition while the nicotine is still gaseous, and utilizing the resultant product as a fumigant.

7. The method of fumigating with nicotine fumigating composition, which consists in heating quickly, to a temperature above the boiling point of nicotine and not above 550° F., a composition containing about 82 parts of anhydrous nicotine, 2 to 5 parts of light lubricating oil, and from 13 to 16 parts of a hydrocarbon selected from the group consisting of kerosene, mineral seal oil, to form a fume, diluting said fume with exhaust gases while still maintaining the temperature of the mixture above the boiling point of nicotine, and utilizing the resultant diluted fume as a fumigant.

ROBERT B. ARNOLD.